United States Patent [19]

Howard

[11] 4,006,865
[45] Feb. 8, 1977

[54] ADJUSTABLE WIRE DISPENSING REELS AND BASE FOR USE IN DISPENSING BOX WIRE

[76] Inventor: Ansel W. Howard, 1301 W. Tenth, Coffeyville, Kans. 67337

[22] Filed: Oct. 7, 1975

[21] Appl. No.: 620,361

[52] U.S. Cl. .......................................... 242/86.5 R
[51] Int. Cl.² ..................................... B65H 17/46
[58] Field of Search ............... 242/86.5 R, 77, 77.1, 242/77.2, 77.3, 71.8 A, 95, 129, 110.2

[56] References Cited
UNITED STATES PATENTS

| | | | |
|---|---|---|---|
| 1,451,131 | 4/1923 | Weber | 242/86.5 |
| 2,705,114 | 3/1955 | Worsham | 242/86.5 R |
| 2,965,327 | 12/1960 | Blary | 242/86.5 R X |
| 3,072,357 | 1/1963 | Sprague | 242/86.5 R |
| 3,134,555 | 5/1964 | Baker | 242/86.5 R |

*Primary Examiner*—Edward J. McCarthy
*Attorney, Agent, or Firm*—Clarence A. O'Brien; Harvey B. Jacobson

[57] ABSTRACT

A plurality of box wire reels are removably mounted in laterally tilted positions on a frame rendered mobile by tilting the frame off its base onto wheels. Each reel has a handle which holds its hub assembly assembled between axially adjustable wheel rims. Releasable latches hold the hub assembly in a radially adjusted position.

9 Claims, 9 Drawing Figures

ADJUSTABLE WIRE DISPENSING REELS AND BASE FOR USE IN DISPENSING BOX WIRE

BACKGROUND OF THE INVENTION

This invention relates to the dispensing of wire from coils.

Portable wire dispensing carriers on which coiled wire supporting reels are rotatably mounted, are well known as disclosed in U.S. Pat. Nos. 2,705,114, 3,178,129 and 3,831,877. Adjustable reel assemblies on which coiled wire is held, are also well known as disclosed, for example, in U.S. Pat. Nos. 1,451,131, 1,831,848, 2,370,868 and 2,971,721. Generally, adjustable reel assemblies are not suitable for removable mounting on reel carriers because of complexities in the construction of the reel assembly itself or in the construction of the carrier. Further, the reel assemblies are not easily transferred from one location to another from the reel carrier. It is therefore an important object of the present invention to provide a mobile-type of reel carrier and adjustable reel assembly construction which avoids the aforementioned drawbacks of the prior art.

In accordance with the present invention, a mobile-type of reel carrier is provided which includes an A-shaped frame section from which axles extend laterally at an upward incline for removable and rotatable support of a plurality of adjustable reel assemblies. Each reel assembly includes a pair of wheel rims that are coupled to a radially adjustable hub assembly, the wheel rims being axially adjustable so as to accommodate coils of wire of different widths. The wheel rims between which a coil of wire is supported, are held assembled on the hub assembly by means of a handle that may be readily removed for disassembly of the reel. The hub assembly includes a central tube into which a supporting axle on the frame is received, one end of the central tube having a flange abutting the frame while the other end is threaded for connection of the handle thereto. A plurality of radially extensible tube members project from the central tube and are connected at their radially outer ends to wire supporting coupling elements that engage the spokes of the wheel rims in axially variable spaced relationship to each other. A releasable locking arrangement holds the radially extensible tube members in radially adjusted positions. By removal of the handle and the releasable locking device, the reel assembly may be fitted into a coil of wire of any diameter or axial width. The reel assembly when assembled with the coil of wire supported thereon, may be placed at any desired location on the mobile carrier frame and transferred from one location to another to facilitate dispensing of the wire therefrom. By means of the handle assembly, the radial dimension of the hub may be changed and when so adjusted the releasable locking device is applied to hold the hub in its radially adjusted position. The handle may then be utilized to rotate the reel in order to dispense wire therefrom.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
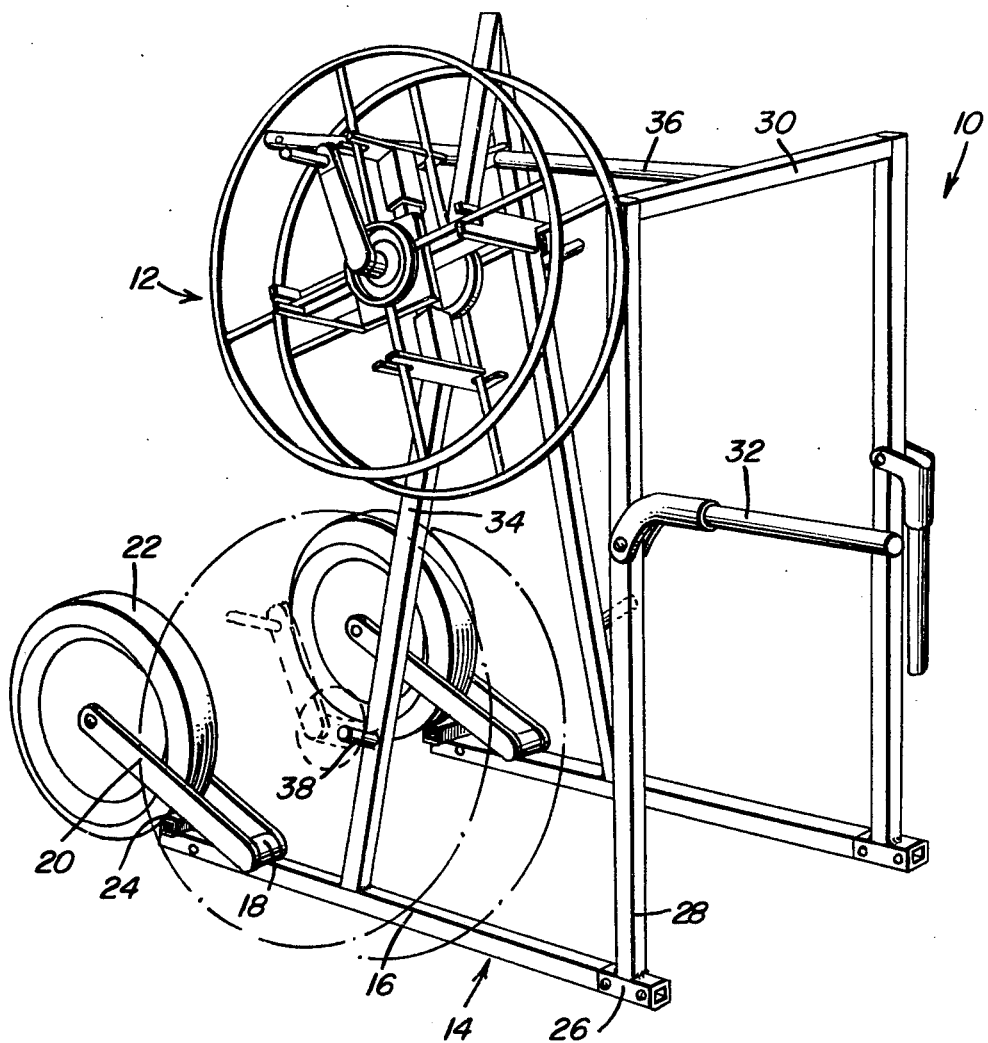
FIG. 1 is a perspective view showing a reel carrier and one of the adjustable reel assemblies mounted thereon.
Figure 2:
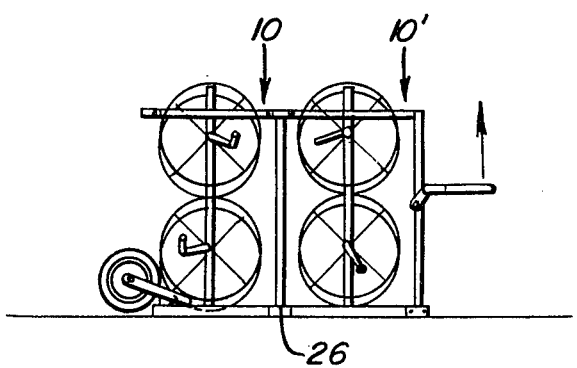
FIG. 2 is a side elevational view of an enlarged reel carrier with reel assemblies mounted thereon in accordance with the present invention.

Referring now to the drawings in detail, FIG. 1 illustrates by way of example a reel carrier generally referred to by reference numeral 10 on which an adjustable reel assembly 12 is shown mounted. In the embodiment illustrated in FIG. 1, four of such reel assemblies may be removably and rotatably mounted on the carrier 10. However, the carrier may be enlarged as shown in FIG. 2 in order to support eight reel assemblies as will be explained hereinafter in further detail.

The reel carrier includes a base portion generally referred to by the reference numeral 14. The base portion includes a pair of parallel spaced, tubular frame members 16 adapted to rest on the ground as shown in FIG. 1. Secured to each of the base frame members 16 adjacent one longitudinal end, is a pivot bearing 18 from which a pair of pivotable supports 20 extend rearwardly for rotationally mounting a roller wheel 22. With the base frame member 16 resting on the ground as shown, the roller wheels 22 are held slightly elevated above the ground by a stop element 24 secured to the rear ends of the base frame members 16 abutting the pivotal supports 20. Tubular sections 26 inserted into the forward ends of the base frame member 16 and fastened thereto support a pair of vertical lift frame members 28 interconnected at the upper end by a cross frame member 30. Pivoted handles 32 are pivotally connected to the vertical lift frame members 28 intermediate the upper and lower ends thereof. The operator may accordingly grasp the handles 32 in order to upwardly tilt the carrier thereby transferring its load from the base frame members 16 to the roller wheels 22 in order to render the carrier mobile.

Secured to the base frame members 16 intermediate the longitudinal ends thereof, are a pair of upwardly converging support frame members 34 interconnected at their upper ends to form an A frame section which is fixedly spaced from the cross frame member 30 by a spacing bar 36. Each support frame member is provided with a pair of vertically spaced axle sections 38 that extend laterally therefrom at an upward incline perpendicular to the support frame member. One of the adjustable reel assemblies 12 may be removably mounted on each of the axle sections 38.

Referring now to FIGS. 4, 5, 6 and 9, each reel assembly 12 includes a pair of identical wheels generally referred to by reference numeral 40. Each wheel 40 includes a radially outer rim 42, a radially inner rim 44 and a plurality of radial spokes 46 interconnecting the inner and outer rims. The wheels 40 are held assembled on either axial side of an adjustable hub assembly generally referred to by reference numeral 48. The hub assembly is connected to a handle generally referred to by reference numeral 50.

Figure 6:
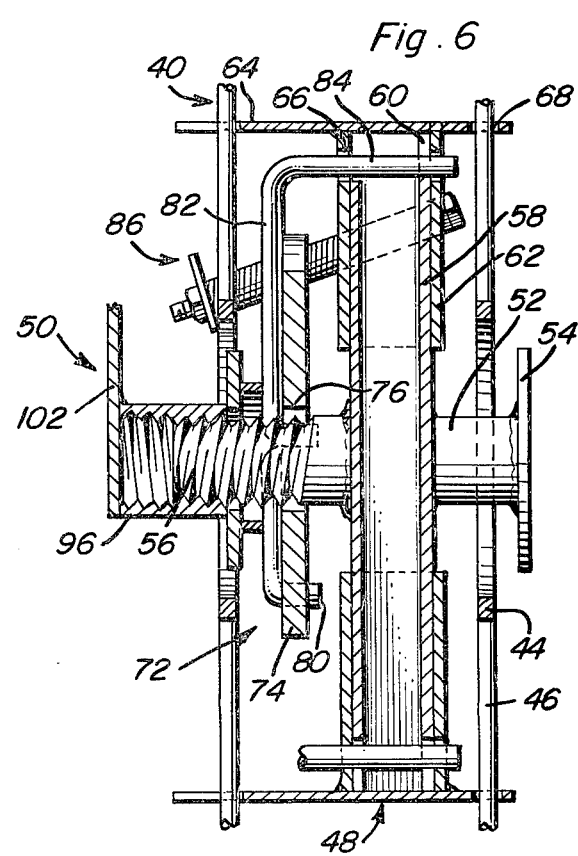
FIG. 6 is a partial sectional view taken substantially through a plane indicated by section line 6—6 in FIG. 4.
Figure 9:
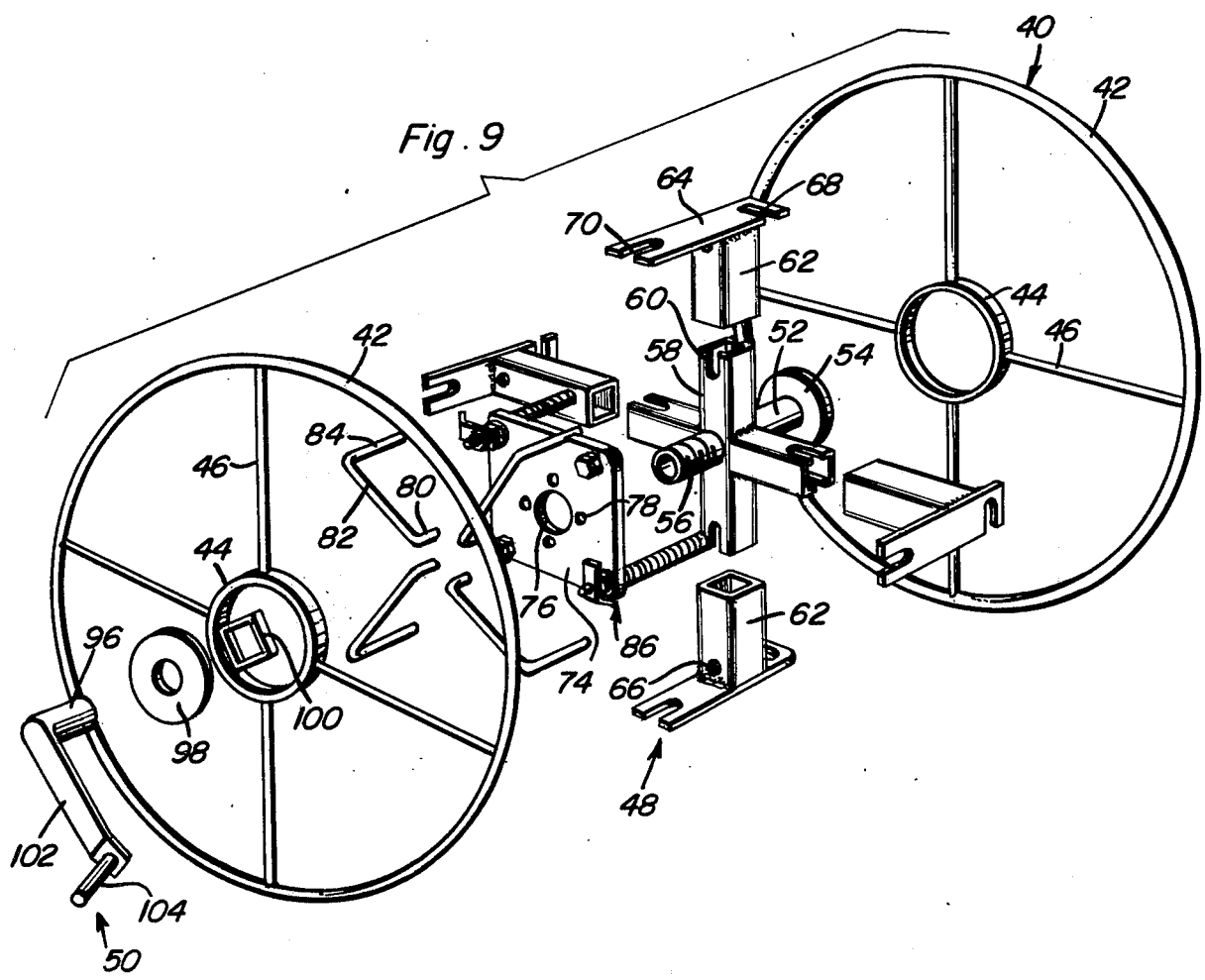
FIG. 9 is a perspective view showing the disassemblied parts of one of the reel assemblies.

As more clearly seen in FIGS. 6 and 9, the hub assembly 48 includes a central tube 52 having at one end a flange 54 and a threaded section 56 at the other end. One of the axle sections 38 on the supporting frame 34 of the carrier 10 is adapted to be received within the central tube 52. In view of the upward incline of the axle section, the flange 54 will abut the support frame. The wheels 40 of the reel assembly are loosely assembled on the central tube 52, one wheel being axially disposed adjacent the flange 54 while the other wheel is axially disposed adjacent the other threaded end 56 of the central tube. Connected to the central tube and extending radially therefrom are a plurality of tubular members 58 having slots 60 formed at the upper ends thereof. A tubular sleeve 62 is slidably received over the radially end portions of each of the tubular members 58 and has an axially extending support plate 64 secured to the outer end thereof. Each sleeve is also provided with openings 66 adjacent the radially outer ends. Each tubular member 58 and sleeve 62 thus forms a radially extensible support for the axially extending support plates 64. Each support plate 64 has adjacent one end a lateral slot 68 adapted to engage a radial spoke 46 of one of the wheels 40 while the other end of the support plate 64 is provided with a longitudinal slot 70 adapted to engage the radial spoke of the other wheel 40. Thus, both of the wheels 40 will be rotationally interconnected with the hub assembly 48 through the support plates 64 at any radially adjusted position thereof.

Figure 7:
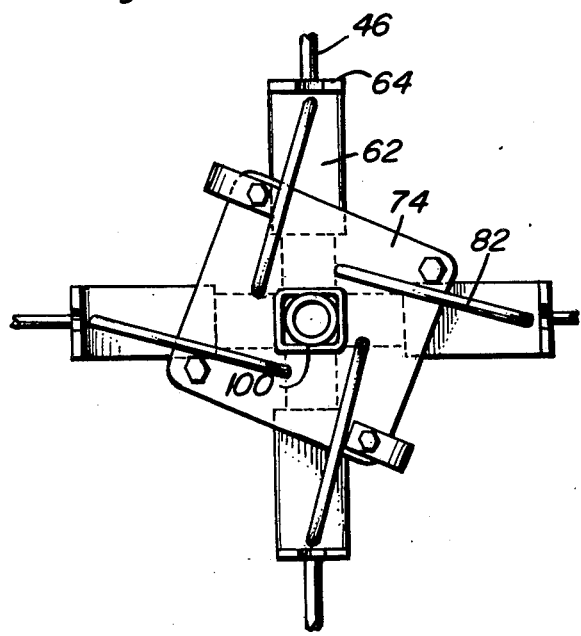
FIG. 7 is a side elevational view of an adjustable hub assembly in a radially extended position.

A locking arrangement generally referred to by reference numeral 72 releasably holds the hub assembly in a radially adjusted position. The locking arrangement includes a rectangular anchor plate 74 having a central opening 76 loosely receiving the central tube 52 therethrough. A plurality of holes 78 are formed in the anchor plate in circumferential relation to the central opening 76 and receive therethrough the radially inner end portions 80 of connecting rod elements 82. The radially outer end portions 84 of each connecting rod element extends through a hole 66 in the sleeve 62 and through a slot 60 in the tubular member 58 aligned therewith. It will therefore be apparent that when the anchor plate 74 is rotated relative to the wheels from the position shown in FIG. 7 to the position shown in FIG. 8, the sleeves 62 will be radially displaced inwardly in order to radially contract the hub assembly. The anchor plate 74 is releasably held therefore in an angularly adjusted position relative to at least one of the wheels 40 in order to hold the reel assembly in a radially adjusted position. Toward that end, a plurality of frictional latch devices 86 are provided.

Figure 3:
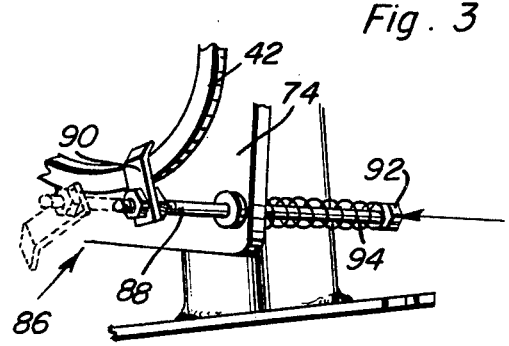
FIG. 3 is a partial perspective view showing one of the releasable locking devices associated with each of the reel assemblies.
Figure 4:
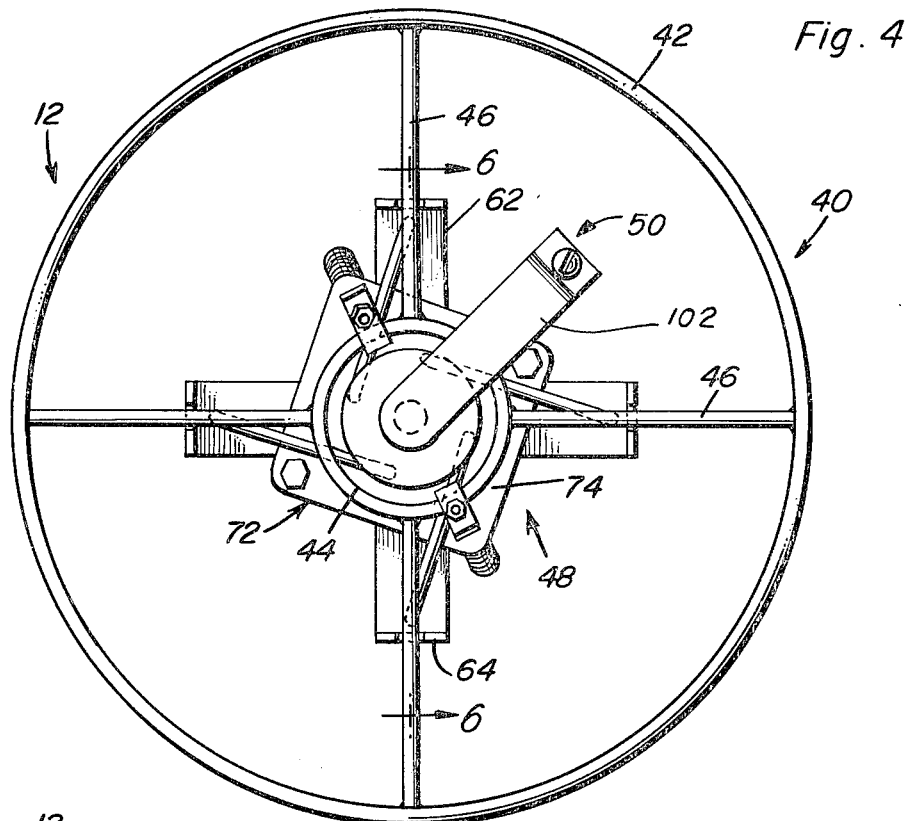
FIG. 4 is a side elevational view of one of the reel assemblies constructed in accordance with the present invention.
Figure 5:
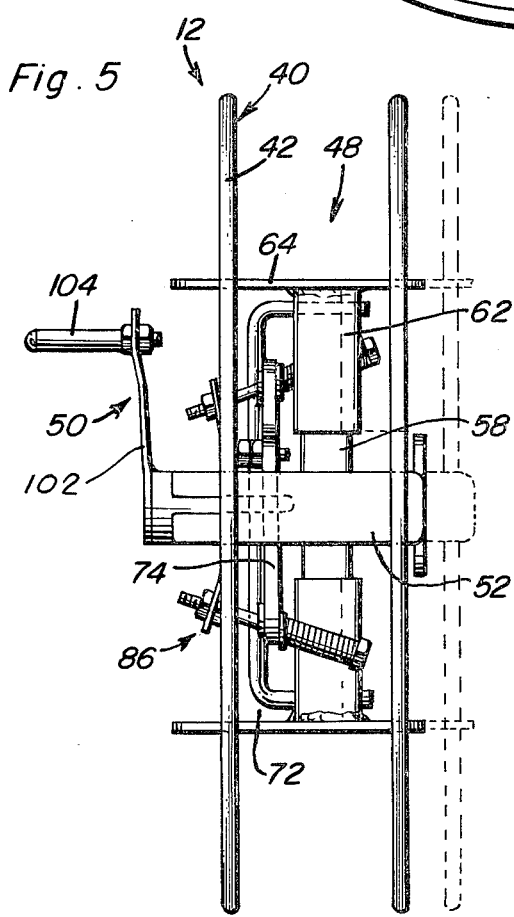
FIG. 5 is a front elevation view of the reel assembly shown in FIG. 4.

Each of the latch devices 86 includes a latch rod 88 as more clearly seen in FIG. 3, one end of which is connected to a latch element 90. The latch rod 88 slidably extends through the anchor plate 74 adjacent a corner thereof and is provided at its end opposite the latch element with an abutment 92 against which a spring 94 reacts, the spring also reacting at its other axial end against the anchor plate 74. The latch rod 88 is therefore drawn outwardly against the bias of spring 94 in order to bring the latch element 90 into engagement with the radially outer rim 42 of one of the wheels 40 as shown by solid line in FIG. 3. In this fashion, the anchor element 74 is held in an angularly adjusted position relative to the wheels 40. To release the latch device 86, the latch element 90 is simply rotated out of engagement with the wheel rim 42 as shown by dotted line in FIG. 3. The angular position of the anchor plate 74 may then be changed and the radial dimension of the hub assembly varied in accordance therewith.

Figure 8:
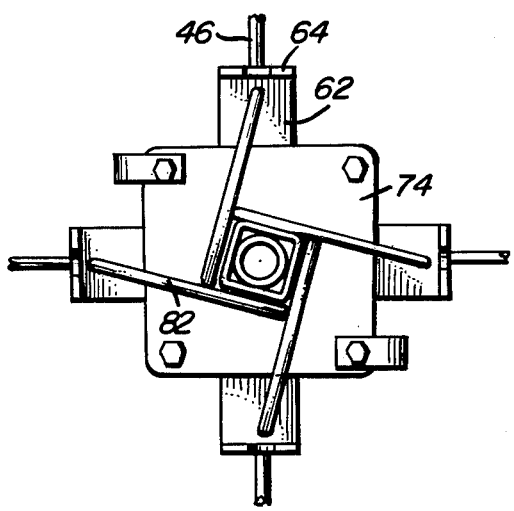
FIG. 8 is a side elevational view of the same radially adjustable hub assembly in a radially contracted position.

The reel assembly is held assembled by means of the handle assembly 50 which includes a tubular portion 96 threadedly connected to the threaded end 56 of the central tube 52. The threaded hub portion 96 holds a washer 98 and spacer 100 clamped against the anchor plate 74. the spacer 100 limits the angular movement of the connecting rods 82 relative to the anchor plate as shown in FIG. 8 in order to thereby determine the minimum radial dimension of the hub assembly. A lever member 102 is connected to the hub portion 96 of the handle assembly and has a hand grip 104 rotatably mounted at its radially outer end. By means of the handle assembly 50, the reel may be rotated in one direction in order to pay out and dispense wire supported on the support elements 64 of the hub assembly. Also, by removal of the handle assembly, the reel may be disassembled in order to fit the hub assembly into a coil of wire of any radial dimension. The axial spacing between the wheels 40 of the reel assembly may be varied to accommodate the width of the coil of wire in view of the slotted connection between the wheels 40 established by the slots 68 and 70 in the support plate elements 64.

The reel carrier 10 may be expanded to hold additional reels by adding another carrier frame assembly 10' as shown in FIG. 2, similar to the carrier frame assembly shown in FIG. 1. The two frame assemblies are interconnected at the base portion 14 by the tubular sections 26. The expanded carrier may therefore support double the number of reel assemblies.

Since each reel assembly 12 is rotatably supported by an upwardly tilted axle section 38, its weight will urge the flange 54 into engagement with the frame member 34 to retard its rotation and thereby prevent overrun and unintended dispensing of wire from the reel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wire dispensing device, comprising a mobile carrier and a plurality of reel assemblies, each of said reel assemblies including a pair of wheels each having radially inner and outer rims interconnected by radial spokes, an adjustable hub assembly rotatably mounted on the carrier and interconnecting the pair of wheels in axially adjusted relation to each other, handle means connected to the hub assembly for holding the wheels assembled on the hub assembly and imparting rotation to the reel assembly, and releasable locking means for holding the hub assembly in a radially adjusted position relative to the wheels.

2. The combination of claim 1 wherein said carrier includes a base having opposite longitudinal ends, supporting rollers connected to the base adjacent one of said ends, lift means connected to the base adjacent the other of the ends for upwardly tilting the carrier to transfer support of the reel assemblies from the base to said supporting rollers and upwardly converging frame members connected to the base intermediate said ends thereof on which the reel assemblies are rotatably mounted.

3. The combination of claim 2 including axles projecting laterally from said frame members on which the reel assemblies are removably received for rotation about rotational axes extending at an upward incline from the frame members.

4. The combination of claim 3 wherein each of said hub assemblies includes a central tube having a flange at one axial end abutting the carrier and connecting means at the other axial end to which the handle means is secured, a plurality of radially extensible members projecting from the central tube, and axially extending support means connected to said radially extensible members for engagement with said spokes of the wheels to rotationally interconnect the wheels and support a coil of wire.

5. The combination of claim 4 wherein said locking means includes an anchor element loosely mounted on the central tube in axial adjacency to the radially extensible members, a plurality of connecting rods pivotally connecting the anchor element to the radially extensible members, and latch means connected to the anchor element and engageable with the inner rim of one of the pair of wheels for holding the anchor element in an angularly adjusted position relative to said one of the wheels.

6. The combination of claim 1 wherein each of said hub assemblies includes a central tube having a flange at one axial end abutting the carrier and connecting means at the other axial end to which the handle means is secured, a plurality of radially extensible members projecting from the central tube, and axially extending support means connected to said radially extensible members for engagement with said spokes of the wheels to rotationally interconnect the wheels and support a coil of wire.

7. The combination of claim 6 wherein said locking means includes an anchor element loosely mounted on the central tube in axial adjacency to the radially extensible members, a plurality of connecting rods pivotally connecting the anchor element to the radially extensible members, and latch means connected to the anchor element and engageable with the inner rim of one of the pair of wheels for holding the anchor element in an angularly adjusted position relative to said one of the wheels.

8. A reel assembly for a wire dispensing device, comprising a pair of wheels each having radially inner and outer rims interconnected by radial spokes, an adjustable hub assembly interconnecting the pair of wheels in axially adjusted relation to each other, handle means connected to the hub assembly for holding the wheels assembled on the hub assembly and imparting rotation to the reel assembly, and releasable locking means for holding the hub assembly in a radially adjusted position relative to the wheels, said hub assembly including a central tube having a flange at one axial end and connecting means at the other axial end to which the handle means is secured, a plurality of radially extensible members projecting from the central tube, and axially extending support means connected to said radially extensible members for engagement with said spokes of the wheels to rotationally interconnect the wheels and support a coil of wire.

9. The combination of claim 8 wherein said locking means includes an anchor element loosely mounted on the central tube in axial adjacency to the radially extensible members, a plurality of connecting rods pivotally connecting the anchor element to the radially extensible members, and latch means connected to the anchor element and engageable with the inner rim of one of the pair of wheels for holding the anchor element in an angularly adjusted position relative to said one of the wheels.

* * * * *